3,198,641
COMPOSITION FOR MAKING HIGH INDEX BEADS

Charles E. Searight and Ezra M. Alexander, Jackson, Miss., assignors to Cataphote Corporation, Toledo, Ohio, a corporation of Ohio
No Drawing. Filed Oct. 19, 1961, Ser. No. 146,316
3 Claims. (Cl. 106—47)

This application constitutes a continuation-in-part of our application Serial No. 115,301, filed June 7, 1961, now abandoned.

This invention relates to an improved composition of glass for use in the manufacture of small glass beads for light reflecting purposes.

In the manufacture of glass beads, which typically range from approximately .04 inch to approximately .0004 inch in diameter, and are used in the reflectorization of both horizontal and vertical markings and signs for safety, advertising, and various other purposes, the glass composition must have a high refractive index.

Present compositions employed in the manufacture of glass beads for use in reflective road signs, reflective road and curb markings, and the like include lead oxide, titanium oxide, barium oxide, and zinc oxide in various quantities. It is well known that lead oxides are both difficult and dangerous to handle, have a tendency to volatilize and leave the glass batch while smelting, and also have a tendency to cause glass containing them to darken under certain atmospheric conditions. Therefore, recent developments and compositions have omitted lead oxide and have substituted therefore, as the principal means of obtaining the high index of refraction, titanium oxides supplemented with barium oxide.

These two constituents are well known in the art to increase the refractive index of the glass, with the titanium oxide having the greatest effect for this purpose.

Presently used compositions contain relatively large quantities, principally of the order of 30 mol percent and upwards of titanium dioxide and relatively large quantities of barium oxide of the order of 40 mol percent and upward. However, practical limitations previously have precluded using barium oxide in a quantity much over 50 mol percent.

For practical use, however, it has been found that the excessive quantities of titanium dioxide necessary to obtain a refractive index in excess of 1.90 (the accepted minimum for this type of application) create two particular difficulties during manufacture. One of the difficulties is that the glass has a tendency to devitrify very readily upon cooling and, secondly, any atmospheric condition during smelting or during spherulizing, other than the ideal atmospheric condition, causes a brownish discoloration of the glass beads which is both objectionable and generally not permissible in the application designated.

It has been found that the substitution of zirconium oxide for part of the titanium dioxide greatly reduces the above difficulties and in some instances completely eliminates them. The zirconium oxide has an even greater effect upon refractive index than does the titanium dioxide and consequently smaller percentages are needed of zirconium oxide when replacing part of the titanium dioxide. It has been found that by substituting zirconium oxide for part of the titanium dioxide, the quantity of the titanium dioxide can be reduced to the point where the tendency to devitrify is greatly reduced, and the problem of discoloration due to adverse atmospheric conditions is very much reduced, if not eliminated altogether.

A typical example in mol percent of an existing glass which has the tendency to devitrify and to discolor under ordinary manufacturing conditions is as follows:

Prior art Example 1

| | Mol percent |
|---|---|
| Titanium dioxide | 42.0 |
| Barium oxide | 35.1 |
| Boric oxide | 10.4 |
| Zinc oxide | 12.4 |
| Other minor ingredients and contaminants | .1 |

Another typical composition is as follows:

Prior art Example 2

| | Mol percent |
|---|---|
| Titanium dioxide | 43.7 |
| Barium oxide | 38.6 |
| Boric oxide | 17.7 |
| Other minor ingredients and contaminants | 4.3 |

Typical compositions of the invention which overcome, wholly or partially, the tendency to devitrify and to discolor under manufacturing conditions, are as follows:

Example 1

| | Mol percent |
|---|---|
| Titanium dioxide | 32.2 |
| Zirconium dioxide | 5.5 |
| Barium oxide | 42.3 |
| Boric oxide | 14.5 |
| Zinc oxide | 5.5 |

Example 2

| | Mol percent |
|---|---|
| Titanium dioxide | 37.3 |
| Zirconium dioxide | 3.5 |
| Barium oxide | 40.2 |
| Boric oxide | 13.8 |
| Zinc oxide | 5.2 |

In actual practice it has been found that 100 grams of the composition of Example 1 melted by heating the material in a platinum crucible for three minutes and forty-five seconds at 2650° F. The composition of Example 2 melted in three minutes and fifty seconds under the same conditions as in Example 1.

It is well known in the glass bead industry that the surface tension of the molten glass is one of the most important bead making properties. The rapidity with which the molten particles of glass become spherical and also the degree of sphericity, depend to a large extent on the surface tension of the glass. Whether spheres are produced from a molten stream of glass in contradistinction to the formation of dumbbells, rods, fibers, etc. depends on the surface tension. In the present higher production rate methods of forming glass beads, the surface tension of the glass must be sufficient to form into spheres in a friction of a second. The surface tension of the glass composition of the invention has high surface tension characteristics as illustrated in the following comparison of surface tension of the prior art compositions and the compositions of the invention:

| | Dynes/cm. @ 900° C. |
|---|---|
| Prior art Example 1 | 291.0 |
| Prior art Example 2 | 314.0 |
| Example 1 of invention | 334.2 |
| Example 2 of invention | 329.9 |

The composition of the invention requires less fuel for melting than required by the prior art examples cited, and, therefore, results in an appreciable savings in fuel costs. Since the melting time of a glass composition is a function of the specific heat of the composition, the lower the specific heat, the lower the fuel needed to render the composition molten. The specific heat comparison data between the prior compositions and the compositions of the invention are as follows:

|  | Cal./gm./° C. |
|---|---|
| Prior art Example 1 | .1608 |
| Prior art Example 2 | .1414 |
| Example 1 of invention | .1293 |
| Example 2 of invention | .1324 |

Another advantage attendant to a composition having a relatively lower specific heat is the size reduction in the means for collecting the glass beads. The greater the specific heat of the glass, the larger the collection system must be so that sufficient time for the molten glass particle to cool and set to the point where deformation and devitrification will not occur. When molten glass spheres or beads strike the walls or the floor of the collector system, they are deformed and in many instances devitrify.

Devitrification occurs when the insufficiently cooled glass beads come into contact with a surface, such as the floor of the collector, and are consequently unable to dissipate the heat rapidly enough to avoid devitrification and opacification. Also, it has been found that the specific heat characteristics of the composition of the invention enable the resultant glasses to pass through the devitrification temperature so rapidly that the normal devitrification of the glass beads in flight does not occur as in the compositions of the prior art as illustrated in the prior art Examples 1 and 2.

In employing the compositions of the invention in the manufacture of glass beads, the glass is caused to become molten and then formed into a glass stream. The stream is broken into particles and these particles are suspended in an air stream maintained in the order of 2300° F. until complete spherulization of the particles has taken place. Then the spherulized glass beads are quickly cooled.

Both of these compositions of the invention compare favorably in cost to previously cited present compositions and consequenly are commercially feasible. Actually, either of the examples given calculated on a ton of glass basis are less expensive than the compositions cited above containing the zinc oxide and are less than 3% higher than the above present composition without the zinc oxide.

According to the patent statutes, we have explained the principles of our invention and have described what we now consider to represent its best embodiments. However, we desire to have it understood that, within the scope of the appended claims, the invention may be practiced otherwise than as specifically described.

We claim:

1. A glass for use in the manufacture of glass beads having an index of refraction of about 1.9 consisting essentially of from about 32 to about 38 mol percent titanium dioxide; from about 3.5 to about 6 mol percent zirconium dioxide; from about 40 to about 43 mol percent barium oxide; from about 13 to about 15 mol percent boric oxide; and about 6 mol percent zinc oxide.

2. A glass for use in the manufacture of glass beads having an index of refraction of about 1.9 consisting essentially of about 32.2 mol percent titanium dioxide; 5.5 mol percent zirconium dioxide; 43.2 mol percent barium oxide; 14.5 mol percent boric oxide, and 5.5 mol percent zinc oxide.

3. A glass for use in the manufacture of glass beads having an index of refraction of about 1.9 consisting essentially of about 37.3 mol percent titanium dioxide; 3.5 mol percent zirconium dioxide; 40.2 mol percent barium oxide; 13.8 mol percent boric oxide, and 5.2 mol percent zinc oxide.

References Cited by the Examiner

UNITED STATES PATENTS

| 2,434,149 | 1/48 | De Poolis | 106—54 |
| 2,554,952 | 5/51 | Mockrin et al. | 106—52 |
| 2,566,134 | 8/51 | Mockrin et al. | 106—52 |
| 2,870,030 | 1/59 | Stadley | 196—47 |
| 2,939,797 | 6/60 | Rindone | 106—47 |
| 2,943,059 | 6/60 | Beck | 106—47 |
| 3,013,888 | 12/61 | La Jarte | 106—52 |

OTHER REFERENCES

Tooley: Handbook of Glass Manufacture, 2nd edition (1957), published by Ogden Publishing Co., New York City, (page 36).

TOBIAS E. LEVOW, *Primary Examiner.*

JOHN R. SPECK, JOSEPH REBOLD, *Examiners.*